(12) United States Patent
Dreke et al.

(10) Patent No.: US 6,463,471 B1
(45) Date of Patent: *Oct. 8, 2002

(54) METHOD AND SYSTEM FOR VALIDATING AND DISTRIBUTING NETWORK PRESENCE INFORMATION FOR PEERS OF INTEREST

(75) Inventors: Christian Dreke; James W. Edwards; Walter K. Hazzard; Aaron Kunze, all of Portland, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/221,628

(22) Filed: Dec. 28, 1998

(51) Int. Cl.[7] .......................... G06F 15/173; G06F 15/16
(52) U.S. Cl. .......................... 709/224; 709/207; 709/204
(58) Field of Search ................................ 709/224, 204, 709/221, 233, 207; 707/9, 10; 379/202; 713/201

(56) References Cited

U.S. PATENT DOCUMENTS

| | | | | |
|---|---|---|---|---|
| 5,870,744 A | * | 2/1999 | Sprague ........................ | 707/9 |
| 5,943,478 A | * | 8/1999 | Aggarwal et al. ........... | 713/201 |
| 6,012,096 A | * | 1/2000 | Link et al. ................... | 709/233 |
| 6,175,619 B1 | * | 1/2001 | DeSimone ................... | 379/202 |
| 6,182,129 B1 | * | 1/2001 | Rowe et al. ................. | 709/221 |
| 6,185,565 B1 | * | 2/2001 | Meubus et al. .............. | 707/10 |

\* cited by examiner

*Primary Examiner*—Le Hien Luu
(74) *Attorney, Agent, or Firm*—Kenyon & Kenyon

(57) ABSTRACT

A method for distributing and maintaining network presence information is presented. According to an embodiment of the present invention, a user logs onto the Internet and transmits to an Internet Presence Information Server (IPIS) his/her presence information, a list of peers (individual network users) whose network presence are of interest to the user, and a request for a list of peers interested in the user's network presence. The IPIS then responds to the user with both a list including the last known Internet Protocol (IP) address for each peer the user is interested in and a list of peers interested in the user's Internet presence. No further communication between the user and IPIS is required after the IPIS responds to the user with these two lists. The user then attempts to directly contact the peers on the first list received from the IPIS by confirming and authenticating the received IP addresses. According to policy, the user directly contacts the peers on the second list received from the IPIS to inform those peers the user is currently signed on-line. Finally, the user periodically "pings" (directly contacts) the confirmed and authenticated IP addresses from the first list received from the IPIS to determine when those peers sign off-line.

16 Claims, 4 Drawing Sheets

METHOD AND SYSTEM FOR VALIDATING AND DISTRIBUTING NETWORK PRESENCE INFORMATION FOR PEERS OF INTEREST

BACKGROUND

1. Field

The present invention pertains to distributing and maintaining network presence information. More particularly, the present invention pertains to a server assisted peer-to-peer network communication method for determining when a person, device or service is present on a network.

2. Background Information

A network may be defined as a group of connected computers that allows people to share information and equipment. For example, a client/server network may consist of one or more client computers connected to a central computer known as a server. People (also referred to herein as "peers," "network users," or "Internet users") may access files stored on the server by using one of the client computers to send a message to the server. In addition to allowing network users to access files stored on central computers, current network technology (such as the Internet) permits an exchange of information between people who are simultaneously present on the network. A person (peer)/device/service is said to be present on a network such as the Internet when he/she/it is currently connected to (or logged on to) the network via a device such as a client computer, a personal computer (PC) or WEB TV. Among other available methods of Internet communication, one peer who is present on the Internet can use his/her PC and attached keyboard to type a message and send the typewritten message to another peer who is simultaneously present on the Internet. In turn, the recipient can transmit a typewritten response to the sender in almost as little time as it takes the recipient to read the incoming message and type the response. To establish Internet communication, as described above, it is desirable for the sender to know when an intended recipient is present on the Internet at the same time the sender is present on the Internet. However, because Internet presence is dynamic in nature, the list of particular peers who are present on the Internet during any one period in time can vary from one second to the next second. Moreover, many Internet service providers assign Internet Provider (IP) addresses dynamically. Hence, it is likely that a peer is assigned a different IP address each time he/she logs onto the Internet. In addition to the Internet communication method described above, dynamic presence information is also useful to other Internet applications such as Internet phones, workgroup applications, games and services such as Internet fax.

Currently, dynamic Internet presence information is employed in "Dynamic Address Books", "Friends and Family Lists", "Active Address Books", and "Buddy Lists™". These applications rely on either Microsoft's Internet Locator Server (ILS) or a proprietary client server protocol (e.g., America On-Line™ (AOL™) or Mirabilis). They store Internet presence information on one or more servers. When using most of these systems, each user can maintain a list of peers whose network or Internet presence are of interest to the user. The AOL™ system designates this list as a "Buddy List™". Users become aware that a certain peer of interest has joined or left the Internet (or the network) when either the sever periodically pushes presence information to each interested user via the user's client computer (as in the AOL™ system) or the user uses a client computer to periodically poll the server to receive the presence information. Due to the dynamic nature of Internet presence for most home users, frequent pushes from the server to the client computer or polls from the client computer to the server are employed so that newly connecting users receive updated presence information in a timely manner. These frequent client interactions (the number of which increase in proportion to the number of "buddies" each logged-on user includes on their individual lists) place a heavy burden on server applications fulfilling these requests and the sub-networks that host them.

Statistical analysis helps illustrate the burden placed on servers using the above described methods. For the following 4 examples, assume: 1) all users are implementing a polling system, 2) each user polls the server every 90 seconds to check for the presence of another user, 3) 10% of all registered users are logged on-line at one time, 4) an average user on-line session lasts 120 minutes, and 5) a keep alive period (defined as the rate at which the polled server updates its presence information) lasts 20 minutes. Example 1: with 10,000 registered users each including 5 buddies on their list, the polling system employs 5,066 server hits per minute (a server hit is defined as an interaction with the server). Example 2: with 10,000 registered users each including 15 buddies on their lists, the polling system employs 15,066 server hits per minute. Example 3: with 1,000,000 registered users each including 5 buddies on their lists, the polling system employs 506,666 server hits per minute. Example 4: with 1,000,000 registered users each with 15 buddies on their lists, the polling system employs 1,506,666 server hits per minute. As these examples illustrate, the burden on the polled server increases significantly with either an increase in the number of buddies each user includes on their list or an increase in the total number of registered users.

The AOL™ system implements a server-push system rather than the client-poll system described in the previous paragraph. In AOL's™ server-push system, users establish a connection with the server when they log on using their client computers. Through this connection, users are informed by the server when peers log on/off the Internet. The fact that each client is required to maintain a permanent connection with the server and that the server is responsible for updating all clients connected to the server also places a significant limit on the number of clients a server can handle.

Accordingly, there is a need for a method which will improve the scalability of current dynamic network presence distribution software.

SUMMARY

According to an embodiment of the present invention, a method for distributing and maintaining network presence information is provided. A user (using, for example, a client computer) first transmits, to a server, a first message including the user's network presence information and a request for peer network presence information. The user next receives, from the server, a second message including the requested peer network presence information. The user then verifies peer network presence using the received peer network presence information.

DETAILED DESCRIPTION

An embodiment of the method according to the present invention will now be explained in the context of keeping track of the presence of three peers on the Internet; however, the present invention is not limited in scope in this respect. For example, the present invention is not limited to the Internet. Any network would suffice. In addition to tracking peers, the present invention is also intended to keep track of devices, people and services.

Figure 1:
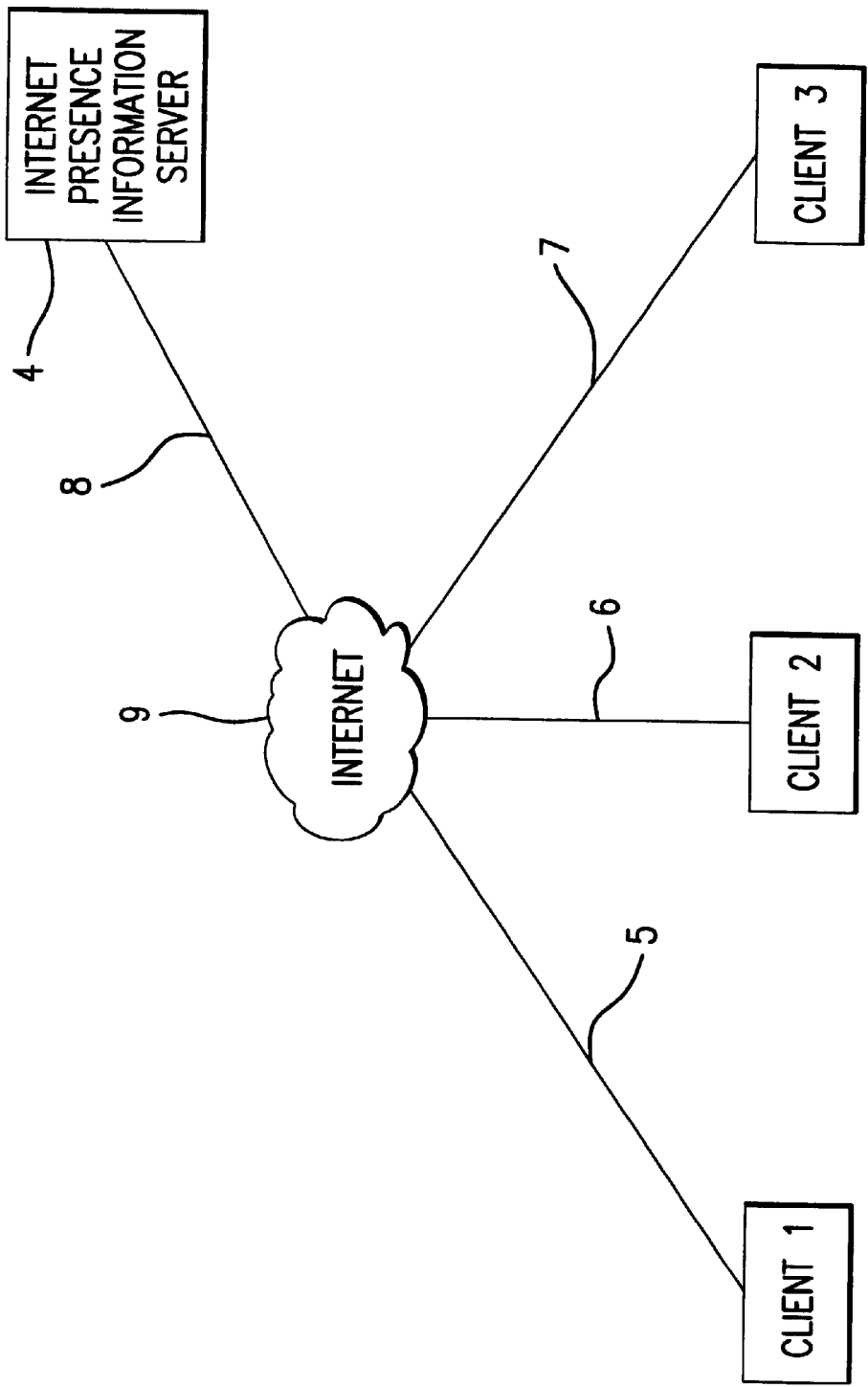
FIG. 1 is a schematic diagram showing three client computers adapted to be coupled to an Internet Presence Information Server (IPIS), according to an embodiment of the present invention.

FIG. 1 is a schematic diagram showing three client computers adapted to be coupled to an Internet Presence Information Server (IPIS), according to an embodiment of the present invention. In FIG. 1, clients 1, 2, and 3 (e.g., three computers each including a Pentium® II Processor (available from Intel Corporation, Santa Clara, Calif.)) are adapted to be coupled to an IPIS 4 (e.g., Microsoft's ILS server in this embodiment) via an Internet 9 using lines 5, 6, and 7 respectively. Line 8 connects IPIS 4 to the Internet 9. In this context, connection refers to a communicative relationship among entities such as an Internet connection. Each of clients 1, 2, and 3 is able to transmit messages to IPIS 4 and receive messages from IPIS 4. For example, each of IPIS 4, client 1, client 2, and client 3 may use their respective processors (in a known manner) to execute software such as Microsoft® Internet Locator Service (ILS) Application Programmer Intereface (API). Microsoft® ILS API enables two-way communication between IPIS 4 and each of clients 1, 2, and 3 by using lightweight directory access protocol (LDAP) layered on transmission control protocol (TCP) to divide messages into packets and sending these packets to ILS software on the intended recipient computer via a network such as the Internet.

Each of clients 1, 2, and 3 is able to directly communicate with another simultaneously on-line client without utilizing IPIS 4. For example, each of clients 1, 2, and 3 may use their respective processors (in a known manner) to execute software such as Microsoft® Winsock application programmer interface (API). Microsoft® Winsock API uses transmission control protocol/Internet protocol (TCP/IP) to divide messages into packets and send the packets from software on one client to software on another client via a network such as the Internet.

Figure 2:
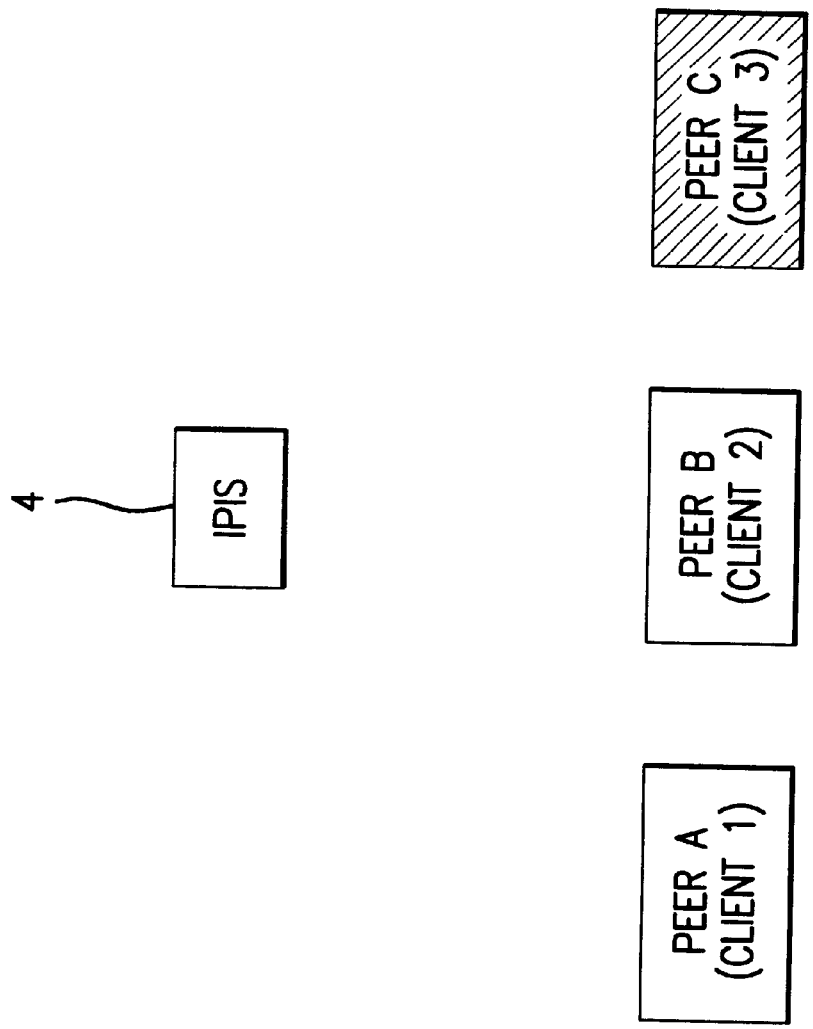
FIG. 2 is a schematic diagram showing an example of an initial Internet presence scenario.
Figure 3:
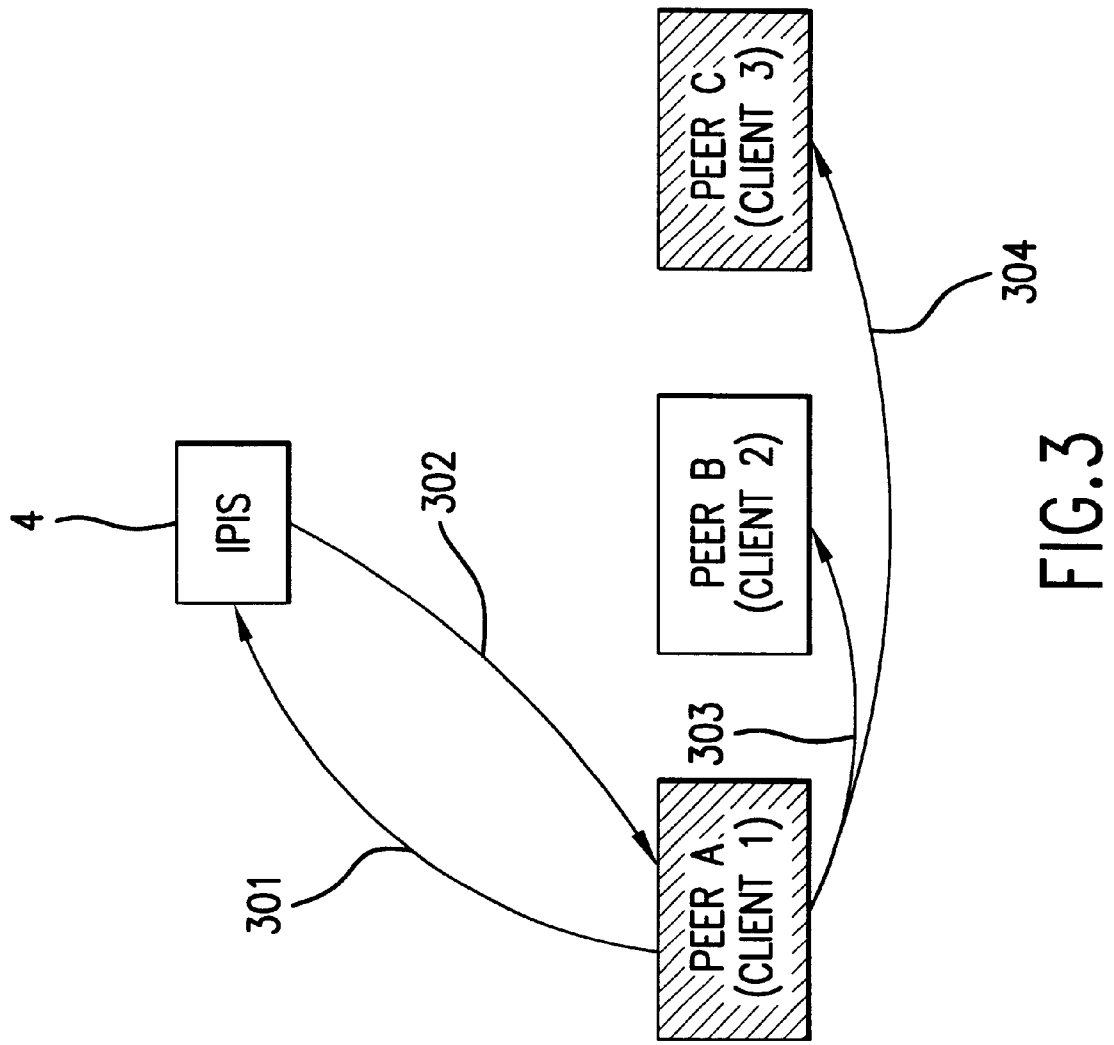
FIG. 3 is a schematic diagram showing an example of a process, after the initial scenario of FIG. 2, which may be taken by a peer upon logging on to the Internet, according to an embodiment of the present invention.

To illustrate an embodiment of a method according to the present invention, assume the following initial conditions: 1) Peers A, B, and C use clients 1, 2, and 3 respectively to log onto the Internet; 2) Peer A is interested in the Internet presence of Peers B and C; 3) Peer B is interested in the Internet presence of Peer A; 4) Peers A and B are not currently logged onto the Internet; and 5) Peer C is currently logged onto the Internet. Once a peer uses one of clients 1, 2, or 3 to log onto the Internet (also referred to in this document as "logging on-line"), the peer is considered to be present on the Internet. FIG. 2 illustrates these initial conditions. In FIG. 2, the white background in the blocks representing Peers A and B indicates they are not currently logged on. The shading in Peer C's block indicates he/she is currently logged on. Events after these initial conditions are sequentially illustrated using the numbered arrows in FIG. 3. In FIG. 3, the shading in both Peer A and Peer C's blocks indicates they are both currently logged on. In 301, Peer A first transmits to IPIS 4 the following information: his/her newly assigned network (Internet Provider (IP)) address; a list of peers whose Internet presence are of interest to Peer A; and a request for a list of peers who are interested in the Internet presence of Peer A. In this example, the list transmitted by Peer A includes Peer B and Peer C. In 302, IPIS 4 responds to Peer A's list by transmitting a list including the last known address, such as an IP addresses for Peer B and Peer C even though the IP address for Peer B is out of date. During 302, IPIS 4 also responds to Peer A's request for a list of peers interested in Peer A's presence with a message indicating no peers are currently interested in his/her presence. Once IPIS 4 transmits these lists to Peer A, Peer A will no longer communicate with IPIS 4 during this network session.

Peer A may now validate the received IP addresses by attempting to directly contact Peer B and Peer C via the Internet without utilizing IPIS 4. This is indicated by the arrows numbered 303 and 304 in FIG. 3. At this point, Peer A does not know which of the IP addresses received from IPIS 4 are valid. Detecting an active Internet host with a certain IP address is not enough to validate that a peer is on-line, because the same IP address that was used during the last Internet session of the peer in question could have been re-used by the Internet Service Provider (ISP) and thus could be in use by another peer. Therefore, validating an IP address would typically involve verifying that an IP address is-currently in use and employing an authentication procedure to verify that the peer in question is still using that IP address. In this case, Peer A is able to validate the IP address received from IPIS 4 for Peer C because Peer C is on-line; however, Peer A is unable to validate the IP address received from IPIS 4 for Peer B because Peer B is not currently on-line. Next, to determine when validated peers go off-line, the peer interested in the validated peer's presence may periodically "ping" the validated peer. "Pinging" a peer involves sending a network message to the peer and waiting for a reply. The peer is still on-line if a reply is received from the peer within a certain amount of time. In this case, Peer A will periodically "ping" Peer C to determine if or when Peer C goes off-line. An improvement of this embodiment of this invention has Peer C keep track of who is "watching" him/her/it. Then, when Peer C changes his/her/its presence status from present to not present, Peer C notifies all Peer C's watchers (including Peer A) about this change.

Peer A now has the option of directly contacting peers from the list, received from IPIS 4, of those peers who are interested in Peer A's presence. Peer A may not wish his/her presence to be known by all the peers interested in Peer A's presence. Peer A has the discretion to contact only those peers Peer A wants to become aware of Peer A's presence. Peer A is not required to contact each peer on the list received from IPIS 4. If a peer on this list is currently on-line, Peer A will be able to successfully inform the peer that Peer A is on-line. In this case, Peer A has no peers to inform of his/her on-line status.

Figure 4:
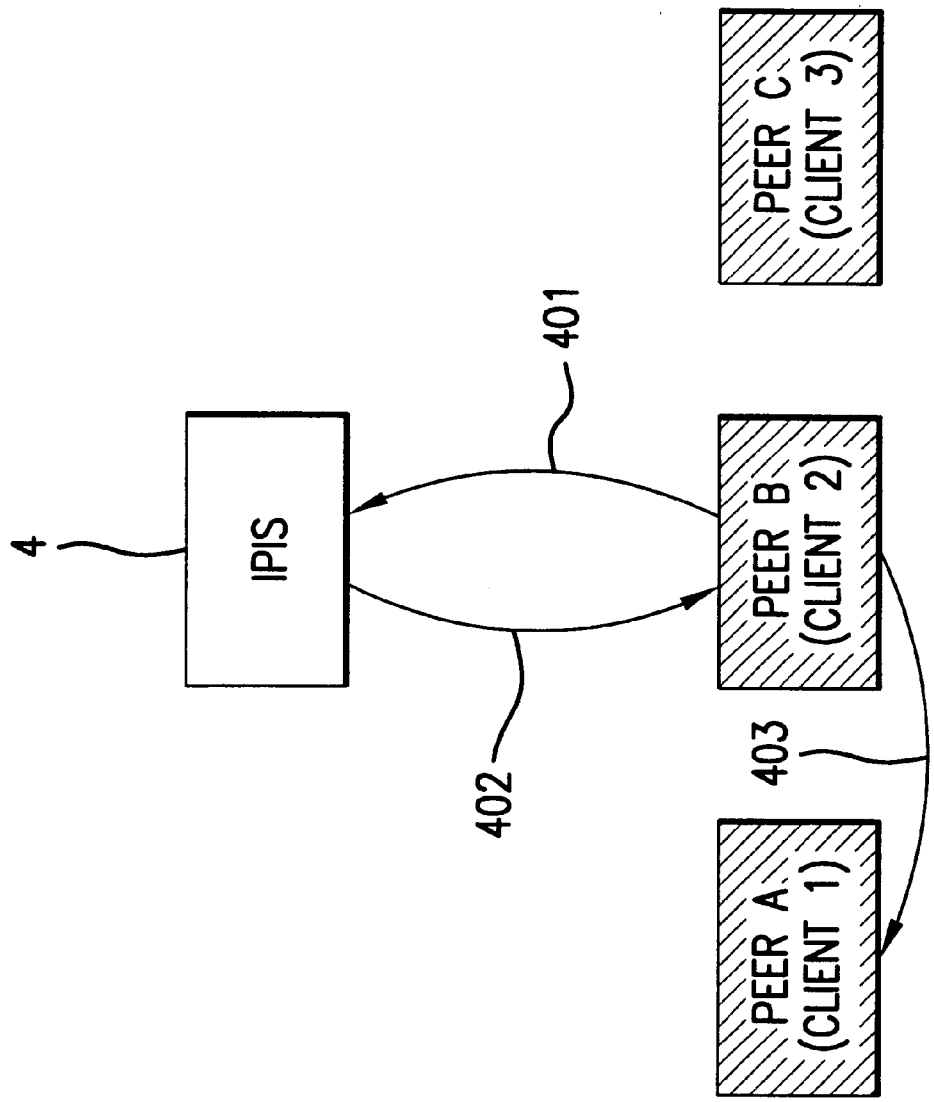
FIG. 4 is a schematic diagram showing an example of a process, after the scenario of FIG. 3, which may be taken by another peer logging on to the Internet, according to an embodiment of the present invention.

When Peer B logs onto the Internet, a similar procedure may be followed. The shaded blocks in FIG. 4 indicate Peers A, B, and C are all currently logged on. In 401, Peer B will first transmit the following information to IPIS 4: his/her newly assigned IP address; a list of peers whose Internet presence are of interest to Peer B; and a request for a list of peers who are interested in the Internet presence of Peer B. In 402 of FIG. 4 (in response to the list of peers whose Internet presence are of interest to Peer B), IPIS 4 will transmit to Peer B a list which includes an IP address for Peer A. In response to Peer B's request for a list of those peers interested in Peer B's presence, in 402, IPIS 4 will also transmit to Peer B a list including the IP address of Peer A. In 403, Peer B will then directly contact Peer A to inform Peer A that Peer B is on-line. Peer B will periodically "ping" Peer A to detect when and if Peer A goes off-line.

The list of peers interested in the network presence of the user can be Server-Static, Server-Dynamic, Client Static, and Client Dynamic. Server-Static was described in the example above where the list is manually created by the user and this information is not refreshed at the server. Server-Dynamic entails refreshing the server using a component on a local machine each time a user uses the machine to log-onto the network. Client-Static entails the user informing the peers who's presence are of interest to him via electronic mail or another method. Client-Dynamic entails the user continuously polling the peer who's Internet presence is of interest until the user contacts the peer on-line. The user will then request that the peer add the user to the peer's list.

Another embodiment of the present invention entails using Lightweight Directory Access Protocol (LDAP). According to this embodiment, a lightweight LDAP server is installed on each client. After logging onto the network, peers interact with the IPIS as described above. However, direct contact between peers is then accomplished utilizing the installed LDAP servers. For example, using LDAP version 3 or higher (including the LDAP version 3 authentication and access control mechanism and including the LDAP version 3 extensions to represent dynamically changing information) the peer to peer communications as described in this document can be accomplished in a secure manner by utilizing the standard LDAP version 3 network protocol. In this scenario, each client implements an LDAP server with a small database containing the user's own presence information. All interactions of the clients can be mapped to LDAP database entry changes and resulting LDAP version 3 modification.

Although several embodiments are specifically illustrated and described herein, it will be appreciated that modifications and variations of the present invention are covered by the above teachings and within the purview of the appended claims without departing from the spirit and intended scope of the invention. For example, although the present invention has been described as coupling persons to the Internet via PC's, other devices can be coupled to the Internet. For example, a person's cellular telephone or facsimile machine could log into the network enabling another user to ascertain the presence of such devices on the Internet and then subsequently communicate with such devices.

What is claimed is:

1. A method for maintaining a list of peers of interest who are present on a network, the method comprising:

transmitting a first list of peers to a server, wherein the first list includes identities of one or more peers whose presence on the network is of interest to a user;

receiving for the one or more peers identified in the transmitted first list a last known network address for each peer from the server;

transmitting to each network address a first message to verify that each network address is active;

in response to the first message, receiving a peer identity corresponding to each active network address;

determining whether the identity of the peer corresponding to each active network address matches with the identity of the one or more peers included in the first list of peers; and for each determined match, validating the peer included in the first list of peers as an authentic peer of interest.

2. The method of claim 1, further comprising:

transmitting a request for a second list of peers, wherein the second list of peers includes identities of one or more peers that are interested in the network presence of the user.

3. The method of claim 2, further comprising:

transmitting a second message to the one or more peers included in the second list, the second message indicates that the user is present on the network.

4. The method of claim 1, further comprising:

periodically transmitting a third message to each matched peer to determine whether the matched peer is present on the network.

5. The method of claim 4, further comprising:

responsive to the periodically transmitted third message, receiving a reply indicating that each matched peer is present on the network.

6. The method of claim 1, further comprising:

transmitting an assigned network address for the user.

7. A system maintaining a list of peers of interest who are present on a network comprising:

a first terminal to transmit a first list of peers, wherein the first list includes identities of one or more peers whose presence on the network is of interest to a user;

a server to receive the first list and to transmit a network address list including last known network addresses for each peer included in the first list to the first terminal;

a second terminal having an active network address corresponding to at least one of the last known network addresses included in the network address list, wherein the first terminal transmits to each last known network address included in the network list a first message and in response to the first message, the second terminal transmits to the first terminal a peer identity corresponding to the second terminal and wherein the first terminal receives the peer identity corresponding to the second terminal and determines whether the peer identity corresponds to at least one of the identities of one or more peers included in the first list of peers and if the peer identity corresponds to at least one of the identities of one or more peers included in the first list of peers, the first terminal validates the peer identity corresponding to the second terminal as an authentic peer of interest.

8. The system of claim 7, wherein the first terminal transmits a request for a second list of peers, wherein the second list of peers includes identities of one or more peers that are interested in the network presence of the user.

9. The system of claim 8, wherein the first terminal first transmits a second message to the one or peers included in the second list, the second message indicates that the user is present on the network.

10. The system of claim 8, wherein the first terminal transmits an current network address assigned to the first terminal.

11. A machine-readable medium having stored thereon a plurality of executable instructions, the plurality of instructions comprising instructions to:

transmit a first list of peers to a server, wherein the first list includes identities of one or more peers whose presence on the network is of interest to a user;

receive for the one or more peers identified in the transmitted first list a last known network address for each peer from the server;

transmit to each network address a first message to verify that each network address is active;

in response to the first message, receive a peer identity corresponding to each active network address;

determine whether the identity of the peer corresponding to each active network address matches with the identity of the one or more peers included in the first list of peers; and for each determined match, validate the peer included in the first list of peers as an authentic peer of interest.

12. The machine-readable medium of claim 11 having stored thereon additional executable instructions, the additional instructions comprising instructions to:

transmitting a request for a second list of peers, wherein the second list of peers includes identities of one or more peers that are interested in the network presence of the user.

13. The machine-readable medium of claim 12 having stored thereon additional executable instructions, the additional instructions comprising instructions to:

transmit a second message to the one or more peers included in the second list, the second message indicates that the user is present on the network.

14. The machine-readable medium of claim 11 having stored thereon additional executable instructions, the additional instructions comprising instructions to:

periodically transmit a third message to each matched peer to determine whether the matched peer is present on the network.

15. The machine-readable medium of claim 14 having stored thereon additional executable instructions, the additional instructions comprising instructions to:

responsive to the periodically transmitted third message, receive a reply indicating that each matched peer is present on the network.

16. The machine-readable medium of claim 11 having stored thereon additional executable instructions, the additional instructions comprising instructions to:

transmit an assigned network address for the user.

* * * * *